United States Patent [19]

Palomer

[11] 4,324,099
[45] Apr. 13, 1982

[54] PROCESS FOR GENERATING MOVEMENT AND ENERGY ON THE BASIS OF THE FLOTATION OF BODIES

[76] Inventor: Enrique P. Palomer, Idumea 10-12, Barcelona, Spain

[21] Appl. No.: 935,927

[22] Filed: Aug. 23, 1978

[30] Foreign Application Priority Data

Aug. 25, 1977 [ES] Spain .................................. 461.890

[51] Int. Cl.³ ............................................ F03B 13/12
[52] U.S. Cl. ........................................ 60/497; 60/495
[58] Field of Search ................................ 60/495–497, 60/398, 639, 640

[56] References Cited

U.S. PATENT DOCUMENTS

| 859396 | 7/1907 | Lynch | 60/325 |
| 1,058,785 | 4/1913 | Nevers | 60/496 |

FOREIGN PATENT DOCUMENTS

| 182218 | 2/1918 | | |
| 719101 | 2/1932 | France | 60/640 |

Primary Examiner—Allen M. Ostrager
Assistant Examiner—Stephen F. Husar

[57] ABSTRACT

The present invention relates to a process for generating movement and energy on the basis of the flotation of bodies, being based on the use of a receptacle provided with a valve for intake and a valve for expulsion of a determined liquid, preferably water, there being situated in the interior of the receptacles a hollow body or a body filled with a material whose density is lower than that of the said liquid but with the special feature that the distance between the two lateral contours of the receptacle and the interior body referred to is minimal and this is for the purpose that the volume of liquid necessary to cause the floating of the said interior body is also minimal, therefore, depending on the variable volume of liquid circulating through the receptacle, thanks to the said intake and expulsion valves, the floating body effects an ascending-descending movement which, by means of conventional elements interposed, is used to transform the said alternating movement into a circular movement or into any other that is deemed pertinent, to activate mechanisms of the most diverse complexity, including those intended to generate and store electric energy. It should be stated that various elements the same as or similar to that detailed may be arranged in battery form in order to act jointly or separately, with the specification that the alternating opening of the valves for the intake and expulsion of liquid into and out of the receptacles, as well as the closing of the said valves is automatically effected when the level of the liquid or that of the floating body incides on conventional electronic devices provided for the purpose.

2 Claims, 3 Drawing Figures

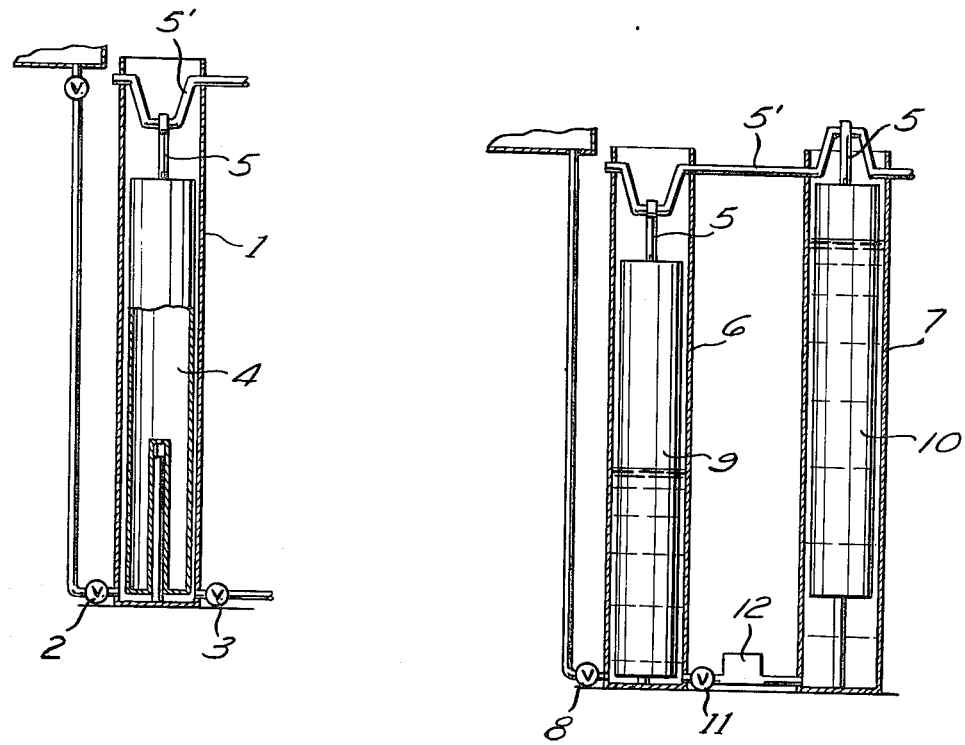
Fig. 1
Fig. 2
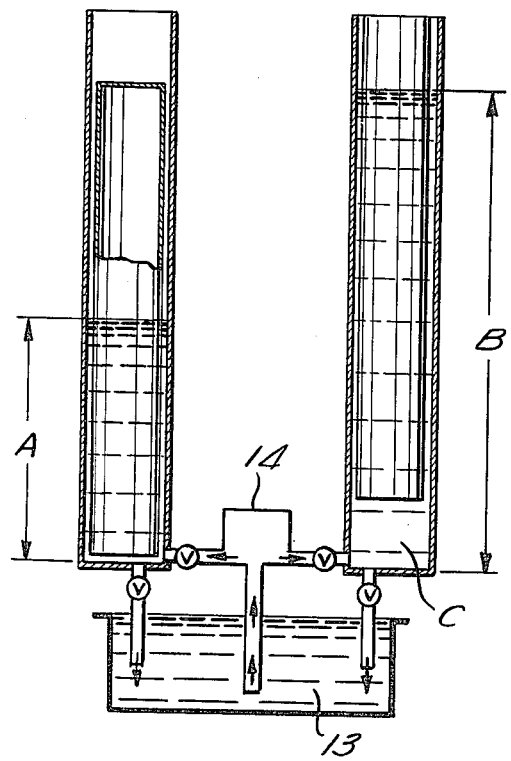
Fig. 3

PROCESS FOR GENERATING MOVEMENT AND ENERGY ON THE BASIS OF THE FLOTATION OF BODIES

TECHNICAL FIELD

The subject of this invention is a process for generating movement and energy on the basis of the flotation of bodies, achieving by means of the said process the development and in some applications the accumulation of energy, making use of means that are in no way pollutants, are very quiet, and in addition, are extremely economical and renewable, since such energy is generated by means of the flow of water in circulation without on the other hand, the intervention of additional pressure other than that which acts on this same water by proceeding from another source of origin situated higher than the level at which the mechanical elements that constitute the process are situated.

BACKGROUND OF THE PRIOR ART

The prior art has employed gravity wheels, pressure machines, and kinetic energy machines for making use of the gravitational potential energy from an elevated liquid source. The use of flotation is known for supporting loads. No prior application of controlled reciprocating flotation for the generation of powr is known.

It is known that the magnitude of upward thrust undergone by a submerged body is equivalent to the weight of the fluid that it displaces. This physical phenomenon occurs whether the floating body is immersed in a very large quantity of water, such as occurs in the case of ships on the sea, or whether these same ships are in dock, where the volume of water is much smaller, and the same occurs if anybody that has a hollow structure or, being solid, has a density lower than that of the fluid in which it is submerged, is situated in the interior of a receptacle which, having an identical or similar form, is differentiated because there is the least possible distance intervening between its walls and those of the floating body, and it is in this minimum space that the liquid which permits the said floating is situated, in addition the upward thrust desired being contributed by means of the volume of the floating body to be submerged and the density of the liquid employed.

SUMMARY OF THE INVENTION

The present invention provides a means of extracting energy through the use of relatively small differences in liquid level. In the present invention, liquid from an available source is caused to flow into a receptacle containing a float. As the level of liquid rises within the receptacle, the float is raised. Through a linkage to an external load, the raising of the float can provide work on the external load. When gravity feed is used, the level of the liquid source need only be as high as the upper level reached by the liquid in the receptacle. By the use of large floats, elevation differences of less than 1 meter can provide substantial work output. After the liquid level has reached a predetermined elevation, and the float has risen to an equilibrium level, liquid is drained from the receptacle whereupon the weight of the float acting through the load linkage means produces further external work. The invention includes level sensing means, valve means, and control means for controlling the valves so as to produce a complete cycle of operation. A preferred form for the receptacle is a vertical cylinder wherein the float is a cylindrical float closely conforming to the cylinder so that a minimal volume of water is required to surround the float to a sufficient depth for flotation. Multiple cylinders may be arranged to further conserve water and recover at least some additional energy from the potential energy of the source by connecting the multiple cylinders such that one float is at the bottom when another float is at the top of the cycle and water is caused to flow from the cylinder having the higher level float to the cylinder having the lower level float until the liquid level is the same in both cylinders. At this point, the float which is at the top of the stroke will have partially descended, and the float which began at the bottom will have risen part way. The remaining liquid in the descending cylinder is then drained or pumped from that cylinder and additional liquid is provided into the ascending cylinder to complete the rising stroke. This arrangement provides for achieving a complete stroke while conserving the quantity of water used.

For a better understanding of this descriptive memorandum drawings are annexed in which, diagramatically and only by way of example, a practical form of embodiment is represented of a process for generating movement and energy, based on the floating of bodies in accordance with the special features briefly stated.

BRIEF DESCRIPTION OF THE DRAWINGS

In the said drawings

FIG. 1 is an axial section of a mechanical assembly constituted only by a tank which houses in its interior a floating body which is connected to the elbow of a crankshaft.

FIG. 2 is a view in which a pair of assemblies similar to that specified above are seen to interconnect, while FIG. 3, which is basically a repetition of the preceding figure, is shown with the sole aim of graphically and theoretically amplifying the physical concepts that make it possible to generate energy on the basis of the floating bodies specified.

DETAILED DESCRIPTION OF THE INVENTION

From the said Figures it transpires that the process for generating movement and energy is constituted by a receptacle 1, provided with an intake valve 2, and another expulsion valve 3, for a determined liquid, generally water, intended to circulate through the interior of the receptacle, in whose interior a hollow body 4, is situated, which can be filled with a material whose density is lower than that of the said liquid, the distance that intervenes between the lateral contour of the receptacle and that of the hollow or floating body 4, being minimal, and this is so for the purpose that the minimum volume of liquid necessary to cause the floating of the interior body referred to is situated in the interstice, therefore depending on the variable volume of liquid intended to circulate through the receptacle, thanks to the intake and expulsion valves, the floating body effects an ascending-descending movement which is transformed by means of the pertinent mechanical elements such as a connecting rod 5, that acts on the elbow of a crankshaft 5', into a rotary movement although the said elements, instead of a connecting rod or a crankshaft may be any others, such as toothed racks and toothed wheels and even the resulting movement of transformation could be other than the rotary movement specified. The transformation of the ascending-descending movement of the floating bodies makes it possible to activate mechanisms of the most diverse complexity, including those that are especially intended to generate electric energy and to store it.

Various elements similar to that detailed, that is to say, composed of a receptacle and a floating body, may be arranged in battery form, all of them acting optionally in combined form on the same element of transformation of the alternating ascending-descending movement into a rotary movement or any other, or acting separately, each one of them acting on an independent element of transformation. On the other hand, and as required, the liquid in circulation may pass from one receptacle to another, which receptacles are connected to one another, or each one may have its pertinent water intake and output without the water proceeding from the other receptacles.

The opening and closing of the valves in the receptacles for the intake and expulsion of liquid are automatically effected by their inciding either at the level of the liquid in the interior of the receptacle, or at the level of the floating body in its ascent, on conventional mechanisms, general electronic, provided for the purpose.

When mechanisms such as those detailed are not installed near rivers, channels or other places where there is an abundance of water, and therefore the consumption of water proves to be expensive, or the water in addition to being costly, is scarce, which for this purpose is the same, the elements that generate the movement and energy described can be interconnected one with another so that the water or any other liquid that circulates through them does so by a closed circuit and subjected to the power of a pump.

The most simple example that can be adduced is that which can be seen in FIG. 2, which is constituted by a pair of receptacles 6 and 7, identical with one another and similar to that previously described, a valve 8 for water intake being provided in 6, which water proceeds from a tank or a determined conduit, at the same time that both receptacles, which have floating elements 9 and 10 situated in their interior, are interconnected by means of a valve—or at times a gate-11, and at the same time, are connected to a conventional pump 12, whose purpose is to convey a certain quantity of water from one receptacle to another and vice versa, all of this so that when the body of the floater 9, situated in the first receptacle, has reached the maximum point of its upward travel, the water intake valve 8 in the said receptacle automatically closes and at the same time the valve or gate that permits the passage of water from receptacle 6 to receptacle 7 opens, with which the floating body 9 begins to descend and the floating body 10 begins to rise until both floating bodies occupy the same level in the two receptacles, which, by virtue of the theory of communicating vessels, would bring about the detention of the ascending-descending movement of the two floaters, unless at the same time that the communication valve or gate between the two receptacles is closed, the pump 12 is started up, which pump conveys the water in the first receptacle to the second receptacle until, when the floater of the latter has reached its pertinent maximum height, the whole of the process detailed is inverted, which is brought about by means of the pertinent conventional electronic mechanisms.

The floating bodies may be guided in their ascending-descending movement with the purpose that their contours do not come into contact with those of the receptacles that pertain to them, either axially, for which a rod can be provided, or peripherally, without any of the devices used for the purpose, or the position they occupy altering in any way the essence of the patent which is based on the fact of generating movement and energy on the basis of the flotation of bodies.

FIG. 3 shows graphically, in order to explain from a theoretical and practical point of view what has been stated above, a pair of receptacles interconnected to a tank 13 situated below them and also connected to one another by means of a pump 14, which is also connected to the tank referred to.

In the case that the weight of the floater is 1,500 kgs and its volume is 3,000 $dm^3$, when the liquid has reached level "A" of the body it will remain floating but without exercising any upward thrust. But if liquid is added to the receptacle in which it is situated, when all the liquid reaches level "B", the floating body whose weight is now 1,500 kgs will have exercised an upward thrust of 1,500 kgs, the lower chamber of the receptacle having gradually been filled with liquid.

The floating body will ascend with greater or less speed according to the flow and the pressure of the water introduced into the receptacle. In the case of the fluid proceeding from a distance the pressure, as is known, will depend on the height at which the source of origin is situated. In the case that a closed circuit is used it will depend on a suction or impelling pump, the ascent depending on the power of the said pump.

The descent of the floating body will be effected in accordance with the evacuation of the liquid added previously, the floating body developing a force of 1,500 kgs in a downward direction.

It is obvious that a greater capacity and speed of admission and expulsion of the liquid into and out of the receptacle will be related to the fact that the floating body ascends and descends with a greater degree of speed; on the other hand, the rate of operation is easily regulated with the purpose of adapting it to the needs required for each case of industrial application, with the specification that although water is almost always used as the liquid that makes the operation possible, in cases in which the circuit is closed, a liquid of greater density can be used, the greater density influencing the increase of the force that the floating bodies will develop.

The materials, forms and dimensions, both absolute and relative, of the different elements used in its embodiment and, in general, all that which does not alter, change or modify the essence of this invention, will be independent of the subject of the said invention.

What is claimed is:

1. A process for generating movement and energy by flotation of bodies on a liquid inside receptacles, comprising the steps of:

causing said liquid to flow into a first receptacle to raise the level of said liquid inside said first receptacle, whereby a first body is raised by flotation;

sensing the level attained by said liquid in said first receptacle;

terminating the flow of liquid into said first receptacle when a predetermined liquid level is attained;

draining said liquid from said first receptacle, whereby said first body descends by gravity as the level of said liquid is lowered;

applying an external load to said first body, the raising of said first body under flotation as said liquid is caused to flow into said first receptacle and the descent of said first body under gravity as said liquid is drained from said first receptacle alternately providing a linear reciprocating motion to said load;

causing a portion of said liquid to flow into a second receptacle containing a second flotation body as said liquid is drained from said first receptacle, whereby said second flotation body is raised through a distance until the level of said liquid is equal in said first and second receptacles; and pumping at least part of the liquid which remains in said first receptacle, after a portion has drained into said second receptacle, from said first receptacle to said second receptacle.

2. A machine for generating movement and energy by flotation of bodies in a liquid, comprising:

a first receptacle having sidewalls, a bottom, and at least one opening whereby liquid can be caused to flow into and out of said first receptacle;

a first interior body disposed within said first receptacle and movable in a vertical direction within said first receptacle, the density of said first body being lower than the density of said liquid, whereby said first body can float in said liquid;

first valve means for controlling flow of liquid into and out of said first receptacle;

sensing means for sensing the level of said liquid within said first receptacle;

at least a second receptacle similar to said first receptacle;

a second interior body similar to said first body;

liquid level sensing means for said second receptacle;

second valve means for said second receptacle;

conduit means connecting said first and second valve means;

control means for controlling said first and second valve means upon the sensing of the level of said liquid so as to: initiate and control the flow of said liquid into said first receptacle when the level of said liquid is below a predetermined value; terminate said inflow when said level has risen to a second predetermined value; initiate and control the flow out of said first receptacle after said inflow has terminated; and causing at least part of said liquid flowing out of one of said receptacles to flow into the other of said receptacles;

linkage means for linking a load to said first and second bodies, each said body being raised by flotation as the level of said liquid is raised and descended as said liquid flows out of said respective receptacles, a linear reciprocating motion is imparted to said bodies; and pump means between each of said receptacles, whereby liquid remaining in one of said receptacles is pumped to another of said receptacles.

* * * * *